United States Patent
Gramme et al.

(10) Patent No.: US 7,901,492 B2
(45) Date of Patent: Mar. 8, 2011

(54) PIPE SEPARATOR INLET

(75) Inventors: Per Eivind Gramme, Porsgrunn (NO);
Gunnar Hannibal Lie, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 469 days.

(21) Appl. No.: 11/886,159

(22) PCT Filed: Mar. 15, 2006

(86) PCT No.: PCT/NO2006/000097
§ 371 (c)(1),
(2), (4) Date: Sep. 12, 2007

(87) PCT Pub. No.: WO2006/098637
PCT Pub. Date: Sep. 21, 2006

(65) Prior Publication Data
US 2008/0134651 A1    Jun. 12, 2008

(30) Foreign Application Priority Data
Mar. 16, 2005 (NO) .................................. 20051387

(51) Int. Cl.
*B01D 19/00* (2006.01)
(52) U.S. Cl. .................. 96/182; 96/204; 96/215; 95/260; 95/243; 95/253; 210/537
(58) Field of Classification Search .................. 96/204, 96/215, 182; 95/260, 243, 253; 210/537; 166/357, 105.5
See application file for complete search history.

(56) References Cited

U.S. PATENT DOCUMENTS

| 1,496,090 A | * | 6/1924 | Marker et al. | ........... 210/170.01 |
| 1,516,132 A |   | 11/1924 | Allen et al. | |
| 1,559,115 A | * | 10/1925 | Marker et al. | ................. 96/184 |
| 1,939,988 A | * | 12/1933 | Knoles | ........................ 210/136 |

(Continued)

FOREIGN PATENT DOCUMENTS

EP    1 044 711    10/2000

(Continued)

OTHER PUBLICATIONS

International Search Report (in English language) issued Jun. 19, 2006 in PCT/NO2006/000097of which the present application is the U.S. National Stage.

(Continued)

*Primary Examiner* — Duane Smith
*Assistant Examiner* — Douglas J Theisen
(74) *Attorney, Agent, or Firm* — Wenderoth, Lind & Ponack, L.L.P.

(57) ABSTRACT

A device in connection with a pipe separator. The pipe separator comprising an extended tubular body (1) with a diameter that is principally the same as or slightly larger than the diameter of the inlet pipe (3) of the pipe separator. A gas manifold (2) is arranged in connection with the inlet pipe. The manifold (2) includes a number of vertical degassing pipes (7), which are connected to the supply pipe (3) immediately ahead of the inlet to the separator and which end in an overlying, preferably slightly inclined gas collection pipe (6). The manifold is designed so that the gas will be diverted up through the vertical degassing pipes and collected in the gas collection pipe (6) for return to the outlet pipe after the separator or transported onwards to a gas tank or gas processing plant or the like.

4 Claims, 2 Drawing Sheets

U.S. PATENT DOCUMENTS

| | | | | |
|---|---|---|---|---|
| 2,507,273 A * | 5/1950 | Schultz | | 96/411 |
| 4,705,114 A | 11/1987 | Schroeder | | |
| 4,760,742 A * | 8/1988 | Hatton | | 73/861.04 |
| 5,288,312 A * | 2/1994 | Payne et al. | | 96/158 |
| 6,413,299 B1 | 7/2002 | Haukeness | | |
| 6,468,335 B1 | 10/2002 | Polderman | | |
| 2006/0162553 A1 * | 7/2006 | Esparza et al. | | 95/43 |

FOREIGN PATENT DOCUMENTS

| | | |
|---|---|---|
| EP | 2004/016907 | 2/2004 |
| RU | 2 119 372 | 9/1998 |
| RU | 2 207 449 | 6/2003 |
| RU | 2241519 | 7/2004 |
| RU | 2319000 | 7/2004 |
| RU | 2259551 | 8/2005 |
| RU | 2 277 668 | 6/2006 |
| SU | 1248630 | 8/1986 |
| WO | 03/033872 | 4/2003 |

OTHER PUBLICATIONS

Patent Cooperation Treaty (PCT) International Preliminary Report on Patentability, issued Jul. 11, 2007 in International Application No. PCT/NO2006/000097.

Canadian Office Action issued Feb. 24, 2010 in corresponding Canadian Patent Application No. 2,600,699.

Australian Office Action issued Jun. 1, 2010 in corresponding Australian Patent Application No. 2006223694.

Russian Official Action (in English language) issued Nov. 17, 2008 in corresponding Russian Patent Application No. 2007138304/03(041899).

* cited by examiner

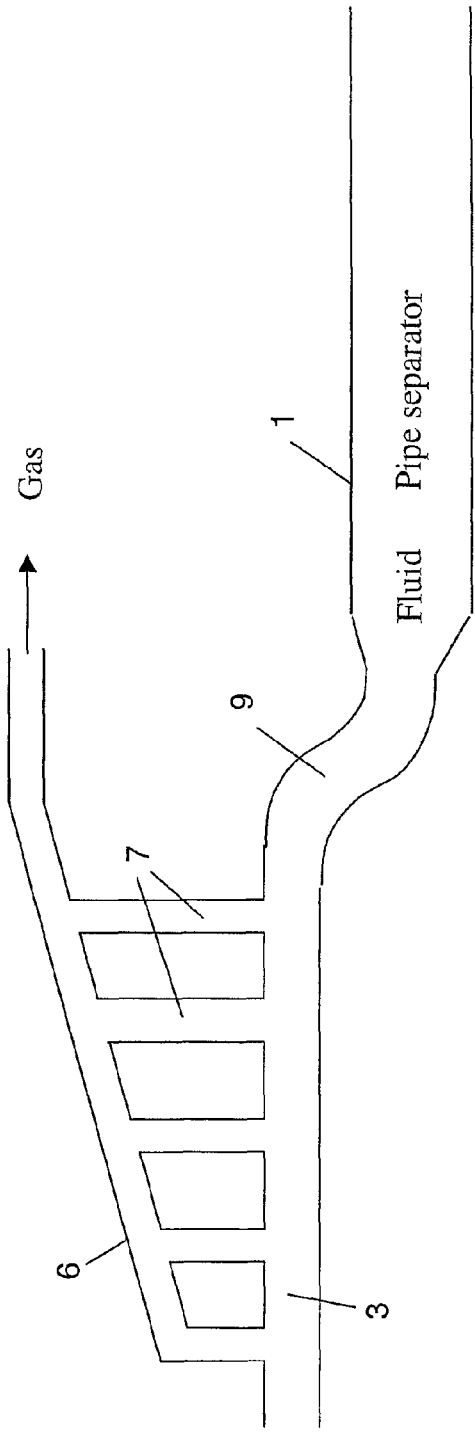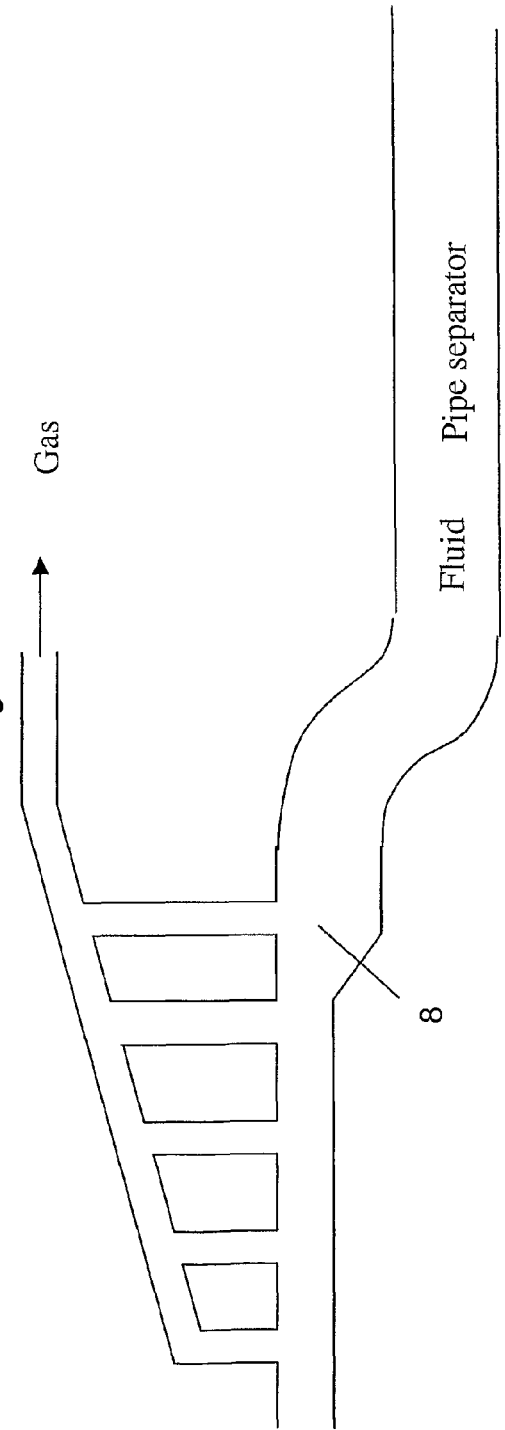

PIPE SEPARATOR INLET

BACKGROUND OF THE INVENTION

1. Technical Field

The present invention concerns a pipe separator or, more specifically, the inlet to such a separator. The pipe separator comprises an extended tubular body with a diameter that is principally the same as or slightly larger than the diameter of the supply pipe of the pipe separator.

2. Description of the Related Art

Applications for patents for pipe separators of the above type were first submitted by the applicant in the present case in 1996. One of these patent applications is the applicant's own international patent application PCT/NO 03/00265, which shows such a separator.

Pipe separators are very effective for separation of fluids with non-mixable fluid components and also represent a simple, structurally light solution compared with conventional gravitational separators. In some situations in connection with the separation of fluids, for example an oil, gas and water flow with a high gas content, plug flow may occur, one reason being design-related conditions, which may reduce the separation in the separator. The present invention represents a solution that will completely eliminate such plug flow.

SUMMARY OF THE INVENTION

The present invention is a device in connection with a pipe separator. The pipe separator comprising an extended tubular body having a diameter that is principally the same as or slightly larger than the diameter of the inlet pipe of the pipe separator. The invention is characterized in that a separate gas manifold is arranged in connection with the inlet pipe. The manifold has a number of vertical degassing pipes connected to the inlet pipe immediately ahead of the inlet to the separator and end in an overlying, preferably slightly inclined gas collection pipe. The manifold is designed so that the gas will be diverted up through the vertical degassing pipes and collected in the gas collection pipe for return to the outlet pipe after the separator or transport onwards to a gas tank or gas processing plant.

BRIEF DESCRIPTION OF THE DRAWINGS

The present invention will be described in further detail in the following using examples and with reference to the attached drawings, where:

FIG. 2 is a longitudinal sectional view of part of a separator with an alternative embodiment in accordance with the present invention; and FIG. 3 shows another example of an alternative embodiment of part of a separator in accordance with the present invention.

DETAILED DESCRIPTION OF THE INVENTION

Figure 1:
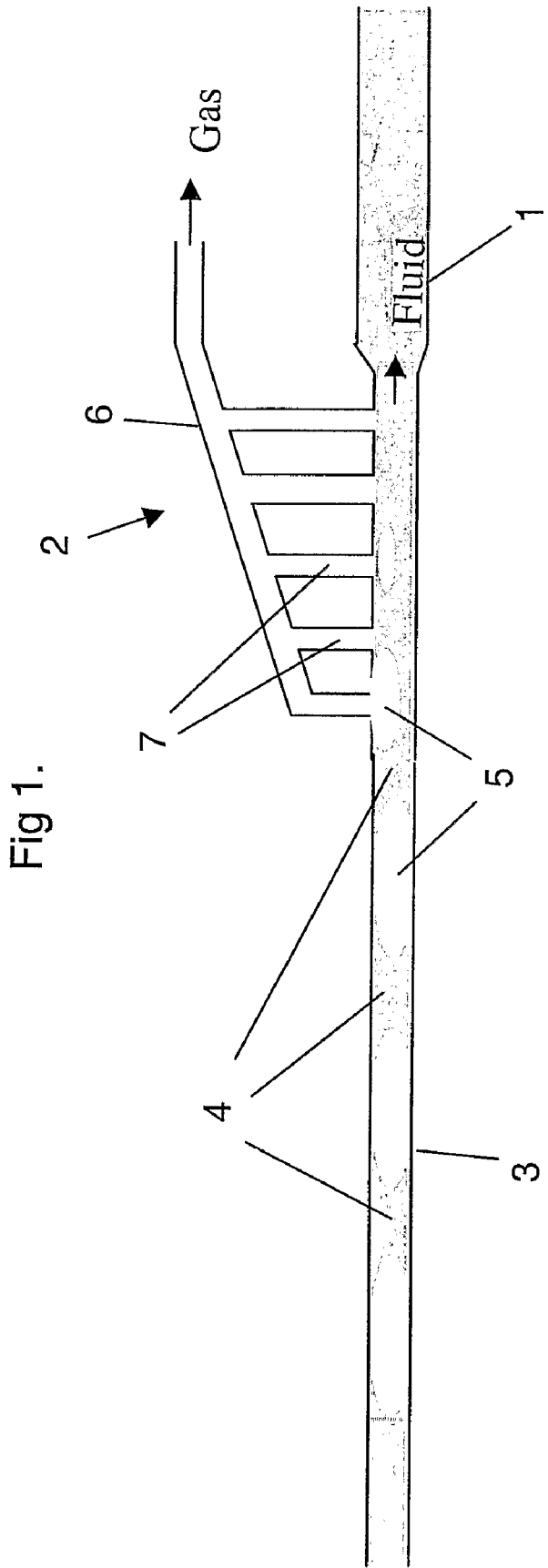
FIG. 1 is a longitudinal sectional view of part of a separator with an inlet in accordance with the present invention.

FIG. 1 shows, as stated above, part of a pipe separator 1 with an inlet in accordance with the present invention arranged in connection with a supply pipe 3 for a multiphase flow, for example oil, water and gas.

The flow pattern in a multiphase flow upstream of the pipe separator is often gas/fluid plug flow if the gas/fluid composition and the design of the supply pipe are unfavorable. In the figure, the fluid plugs 4 are shown as darker parts, while the gas takes the form of gas bubbles 5 in a light color or white.

The present invention involves "puncturing" the gas bubbles and removing them so that the gas phase is mainly collected in a gas collector and the fluid phase remains in the main pipe. This is achieved by means of a gas manifold 2, arranged in connection with the inlet. The manifold 2 comprises a number of vertical degassing pipes 7, which are connected to the supply pipe immediately ahead of the inlet to the pipe separator and which end in a slightly inclined gas collection pipe 6. The gas is thus diverted up through the vertical degassing pipes and collected in the gas collection pipe 6.

Tests have shown that this is an effective way of eliminating plug flow while also ensuring that a constant fluid flow is supplied to the pipe separator 1. The gas that is removed can bypass the pipe separator via the gas collection pipe 6 and be added to the oil phase straight after the separator, or it can be transported onwards to a gas tank or the like. The system can be designed so that the gas removal is driven by the normal pressure drop in the system.

FIG. 2 shows an alternative solution in which the supply pipe 3 with the gas manifold 2 is raised to a level (in the area 9) above the pipe separator 1. By raising the gas manifold above the pipe separator, as has been done here, the gas is forced along the gas path, i.e. up into the gas manifold 2.

Moreover, as shown in FIG. 3, the diameter of the supply pipe at the inlet to the separator, under (at 8) the last of the degassing pipes 7 of the manifold, may have an enlarged diameter, for example equivalent to the diameter of the pipe separator. By increasing the pipe diameter in the last part of the gas manifold so that the fluid speed in the pipe is reduced, gas that is not separated can flow back to the last degassing pipe 7.

The purpose of the design of the gas manifold in accordance with the present invention is to:

1. Separate out the gas phase from a gas/oil/water well flow in a simple manner that does not subject the multiphase flow to high shearing forces. High shearing forces are normally negative for the separation.
2. Ensure the fluid flow has the correct phase in the separator, i.e. water-continuous flow for the water phase and oil-continuous flow for the oil phase. This reduces mixing in the separator inlet and reduces the formation of multiple dispersions in the mixing process in the inlet.

The invention claimed is:

1. A device in combination with a pipe separator, the pipe separator comprising an extended tubular body having a diameter, the device comprising:
   an inlet pipe having a diameter that is equal to or less than the diameter of the pipe separator;
   a gas manifold connected to the inlet pipe, the gas manifold including a plurality of vertical degassing pipes connected to the inlet pipe immediately ahead of the pipe separator; and
   a gas collection pipe overlying and connected to ends of the vertical degassing pipes,
   wherein the gas manifold is arranged such that, in use, gas is diverted up through the vertical degassing pipes and collected in the gas collection pipe for return to an outlet pipe downstream of the pipe separator or transport to a gas tank or a gas processing plant,
   wherein the inlet pipe has an enlarged diameter portion in a region adjacent the pipe separator and at least a last one of the vertical degassing pipes with respect to a direction of flow through the inlet pipe.

2. The device in combination with the pipe separator, as claimed in claim 1, wherein the inlet pipe and the gas manifold are disposed at a level above the pipe separator.

3. The device in combination with the pipe separator, as claimed in claim 1, wherein the enlarged diameter portion has a diameter that is equal to the diameter of the pipe separator.

4. The device in combination with the pipe separator, as claimed in claim 1, wherein the gas collection pipe is inclined with respect to the inlet pipe.

* * * * *